United States Patent
Kang et al.

(10) Patent No.: US 6,721,576 B2
(45) Date of Patent: Apr. 13, 2004

(54) APPARATUS FOR EXPANDING COVERAGE AREA OF BASE STATION

(75) Inventors: Hong-Koo Kang, Ichon-shi (KR); Young-Jae Cha, Ichon-shi (KR)

(73) Assignee: Hyundai Electronics Industries Co., Ltd. (KR)

( * ) Notice: Subject to any disclaimer, the term of this patent is extended or adjusted under 35 U.S.C. 154(b) by 580 days.

(21) Appl. No.: 09/770,350

(22) Filed: Jan. 26, 2001

(65) Prior Publication Data

US 2001/0009856 A1 Jul. 26, 2001

(30) Foreign Application Priority Data

Jan. 26, 2000 (KR) .......................................... 2000-3678

(51) Int. Cl.[7] .............................. H04B 1/38; H04M 1/00
(52) U.S. Cl. ....................... 455/561; 455/557; 455/502; 455/525
(58) Field of Search ................................. 455/561, 560, 455/427, 12.1, 557, 13.2, 502, 524, 525, 434, 422.1, 456.5, 453, 11.1, 15, 63.1, 503, 517; 375/356; 342/357.06

(56) References Cited

U.S. PATENT DOCUMENTS

| | | | | |
|---|---|---|---|---|
| 5,459,728 A | * | 10/1995 | Yoshioka et al. | 455/63.1 |
| 5,544,171 A | * | 8/1996 | Godecker | 455/561 |
| 5,819,181 A | * | 10/1998 | Kotzin et al. | 455/503 |
| 6,421,330 B1 | * | 7/2002 | Chung et al. | 455/561 |
| 6,483,817 B1 | * | 11/2002 | Antonio et al. | 370/328 |

* cited by examiner

Primary Examiner—Nay Maung
Assistant Examiner—John J Lee
(74) Attorney, Agent, or Firm—Baker Botts LLP

(57) ABSTRACT

An apparatus for controlling a global positioning system (GPS) reference signal to be provided to a base station modem is disclosed to expand a coverage area of a base station, which comprises a GPS clock reception block for generating a system clock and a pp2s signal based on a reference time from the GPS; a system clock distribution block for distributing the system clock received from the clock reception block; a clock generation block for receiving the pp2s signal and generating a clock signal as base station synchronous signals for the expansion of the coverage area; a base station modem block with a multiplicity of base station modems, for performing data modulation/demodulation in synchronism with a corresponding clock signal; a CPU for generating a control signal; and a controller for allowing the data to be transmitted to a selected one among the base station modems, in response to the control signal.

7 Claims, 10 Drawing Sheets

APPARATUS FOR EXPANDING COVERAGE AREA OF BASE STATION

FIELD OF THE INVENTION

The present invention relates to an apparatus for generating a base station clock; and more particularly, to an apparatus for controlling a global positioning system (GPS) reference signal to be provided to a base station modem to thereby expand a coverage area of the base station.

DESCRIPTION OF THE PRIOR ART

In general, a base station modem is operated based on a reference signal /pp2s (pulse per 2 seconds) and a system clock (19.6608 MHz) provided thereto from a global positioning system (GPS). In this case, a terminal transmits signals in synchronism with a Sync channel provided from the base station.

However, the signal provided from the terminal in the base station modem is delayed than time of the GPS reference signal/pp2s, and the base station modem can demodulate (call) signals with less delay than about 512PN chip (416.67 $\mu$sec), wherein 416.67 $\mu$sec will come to about 60 km in length.

In short, if signals transmitted from a terminal are received by the base station, the terminal being positioned at a distance more than about 60 km from the base station, the base station modem fails to demodulate the received signals to fail calling. In addition, a limited call coverage allows calling in a location at which the base station cannot be installed to be failed.

SUMMARY OF THE INVENTION

It is, therefore, a primary object of the present invention to provide an apparatus, which is capable of delaying a GPS reference signal to be forwarded to a base station modem for a certain time period and transmitting a delayed signal to the modem, to thereby establish calling between the base station and a terminal located at a certain distance from the base station.

In accordance with a preferred embodiment of the present invention, there is provided an apparatus for generating a clock signal used to expand a coverage area of a base station, which comprises: a clock reception means for generating a system clock and a pp2s (pulse per 2 seconds) signal based on a reference time provided from a global positioning system (GPS); a clock distribution means for distributing the system clock received from the clock reception means; a clock generation means for generating clock signals as base station synchronous signals to expand the coverage area by receiving the pp2s signal from the clock reception means; a multiplicity of base station modems for modulating/demodulating data in synchronism with the clock signal transmitted from the clock generation means; a control signal generation means for generating control signals; and a control means for allowing the data to be transmitted to a selected base station modem among the base station modems in response to a corresponding control signal from the control signal generation means.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Figure 1:
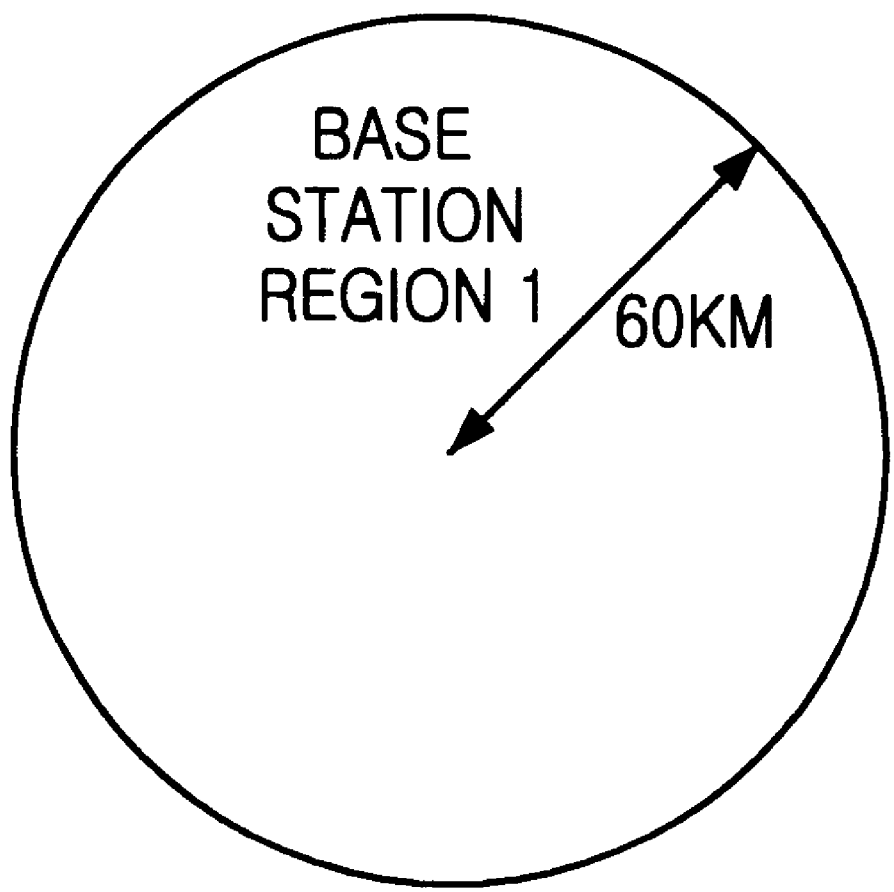
FIG. 1 is a pictorial view representing a coverage area of the conventional base station.
Figure 2:
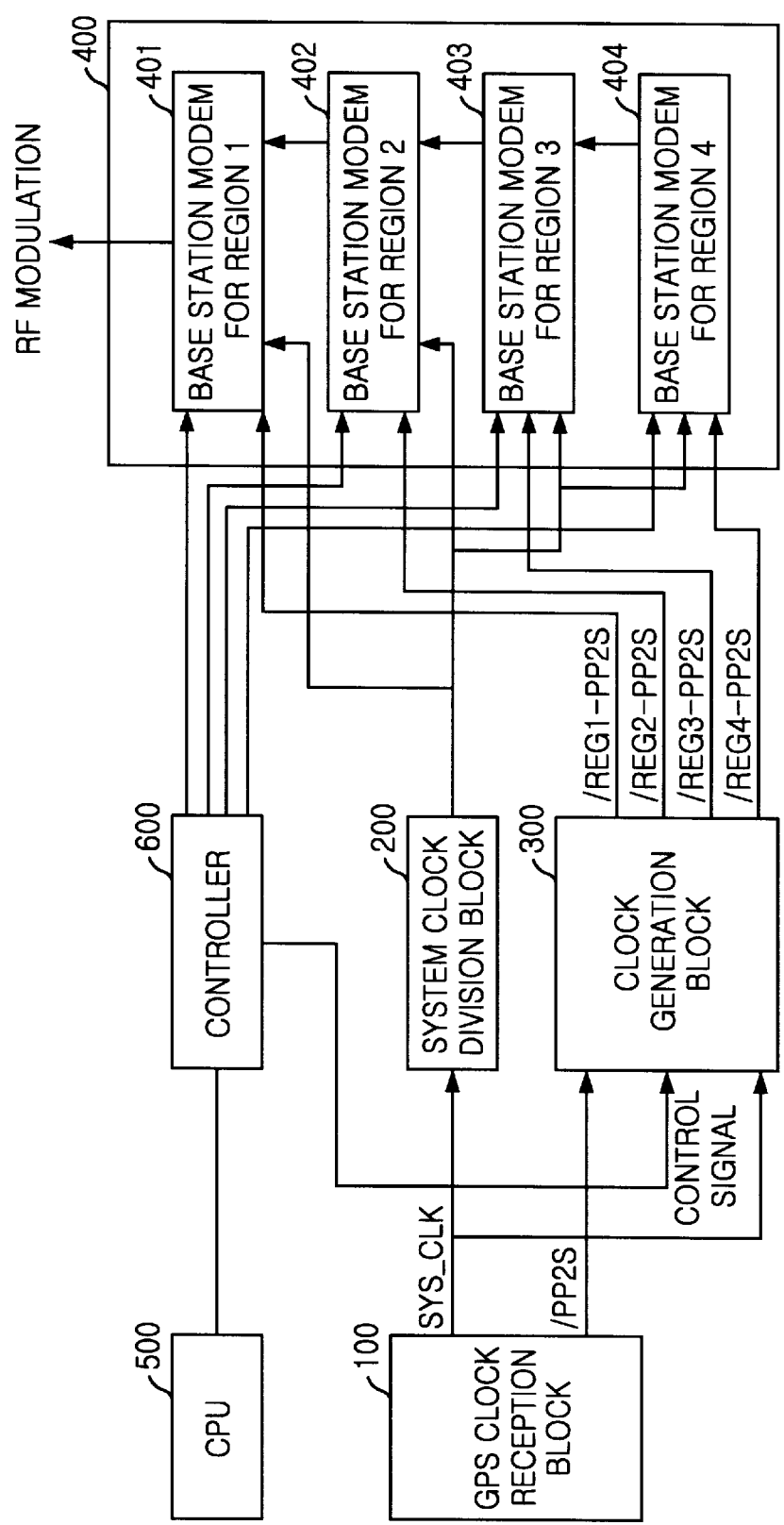
FIG. 2 is a schematic block diagram of a clock generation apparatus for expanding a coverage area of a base station in accordance with a preferred embodiment of the present invention.
Figure 3:
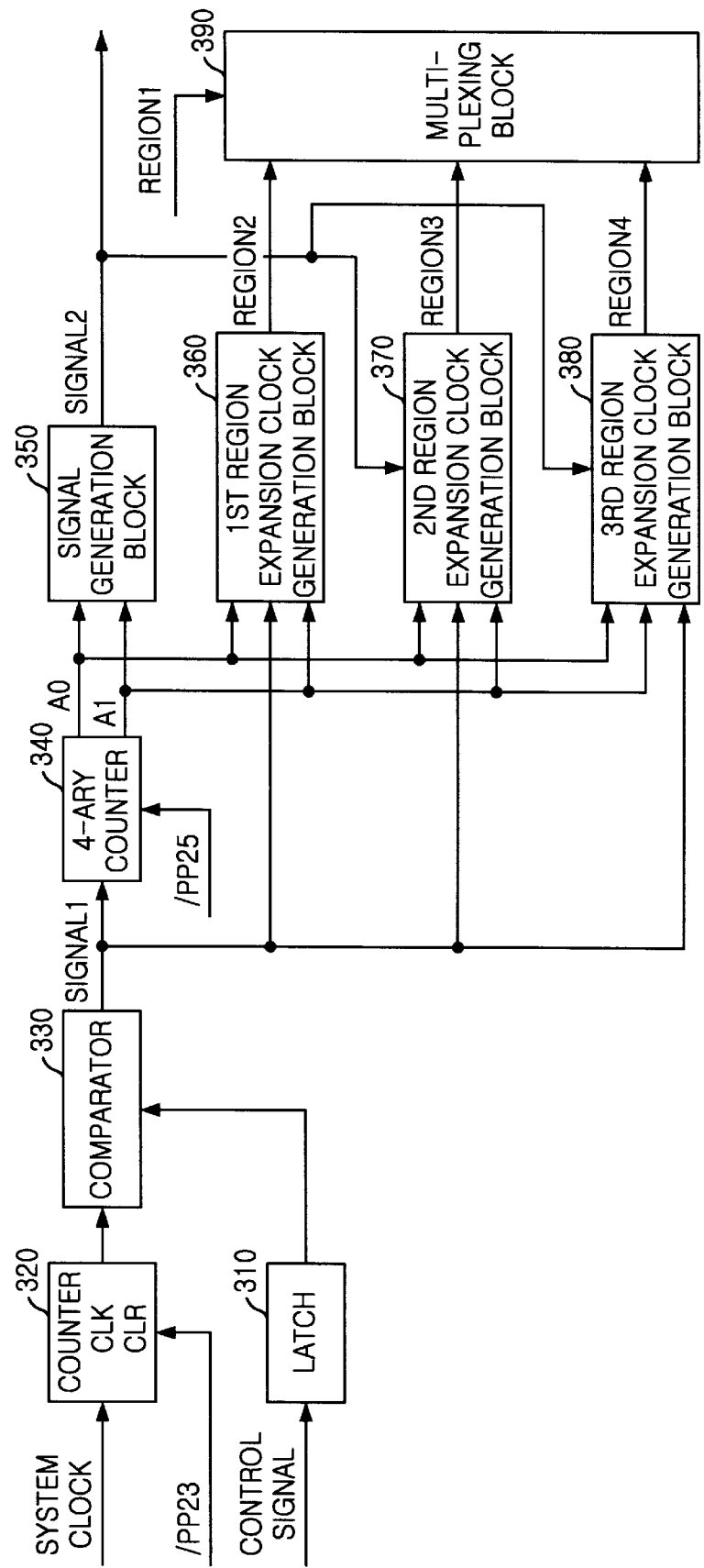
FIG. 3 is a detailed block diagram of a clock generation block shown in FIG. 2 in accordance with a preferred embodiment of the present invention.
Figure 4:
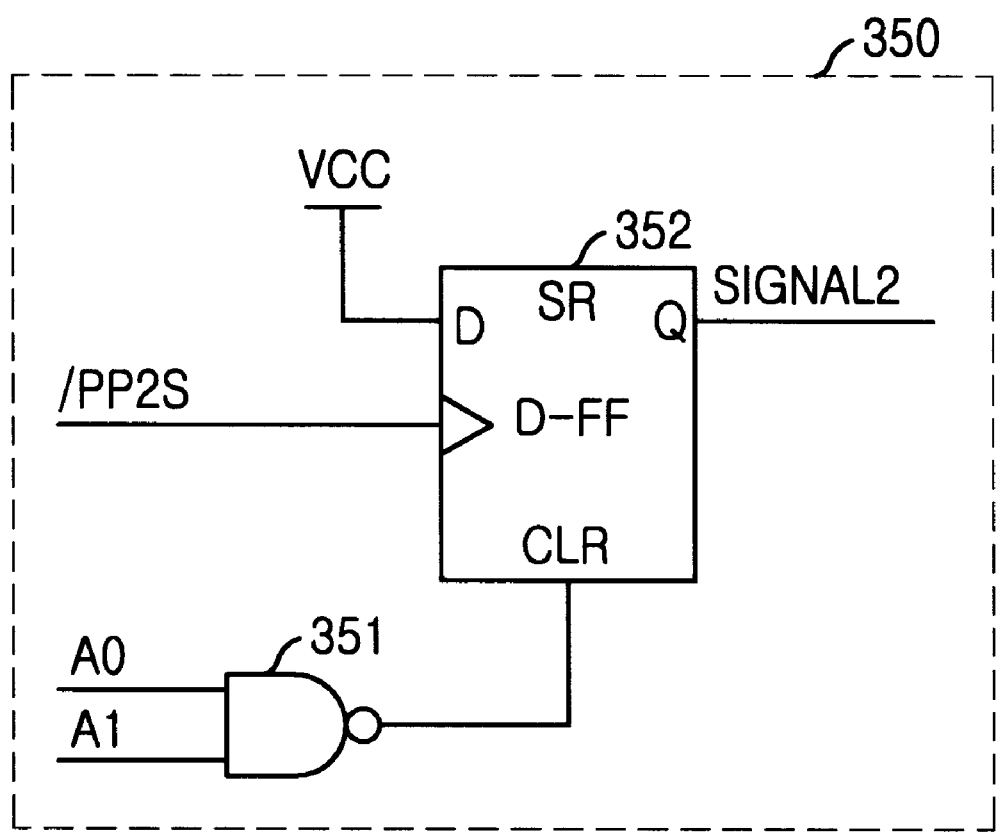
FIG. 4 is a detailed block diagram of a signal generation unit shown in FIG. 2 in accordance with a preferred embodiment of the present invention.

FIGS. 2 to 4 are a schematic block diagram of a clock generation apparatus for expanding a coverage area of a base station, a detailed block diagram of a clock generation block shown in FIG. 2 and a detailed block diagram of a signal generation unit shown in FIG. 2, respectively, in accordance with a preferred embodiment of the present invention.

Figure 5:
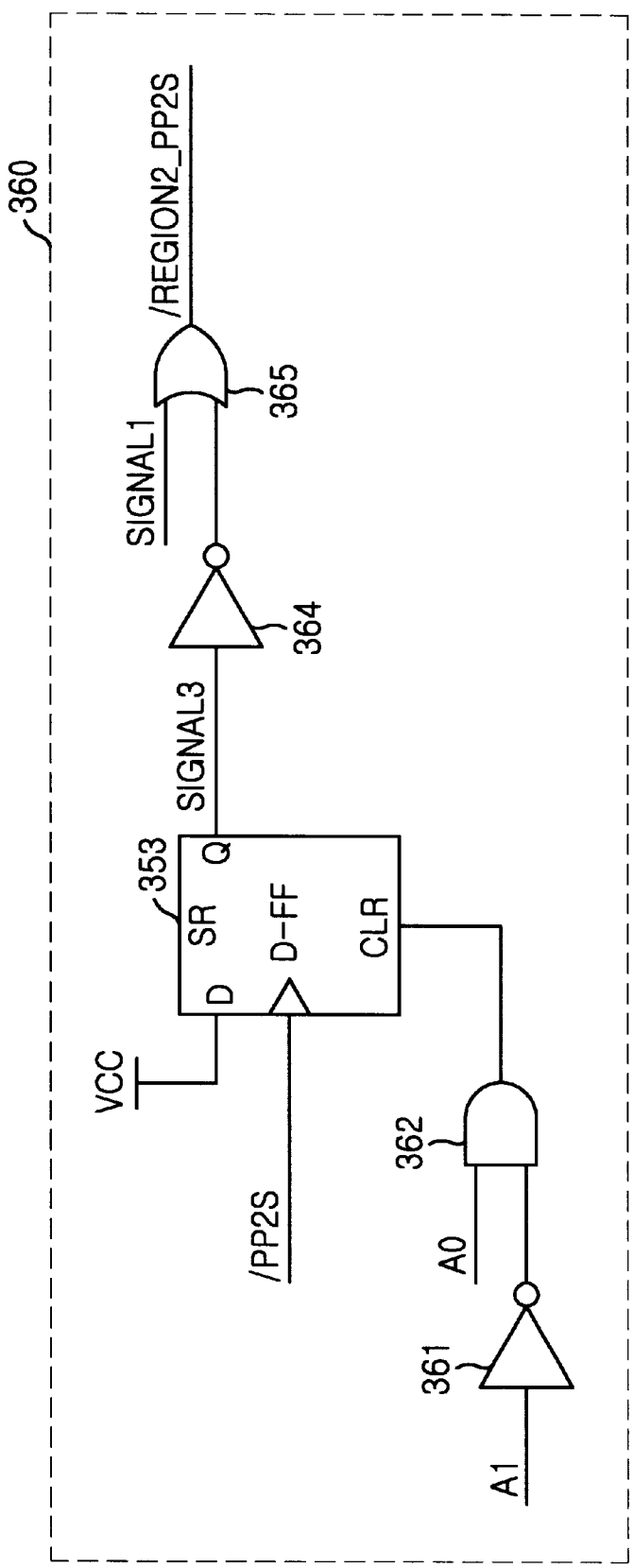
FIG. 5 is a detailed block diagram of a first region expansion clock generation block shown in FIG. 2 in accordance with a preferred embodiment of the present invention.
Figure 6:
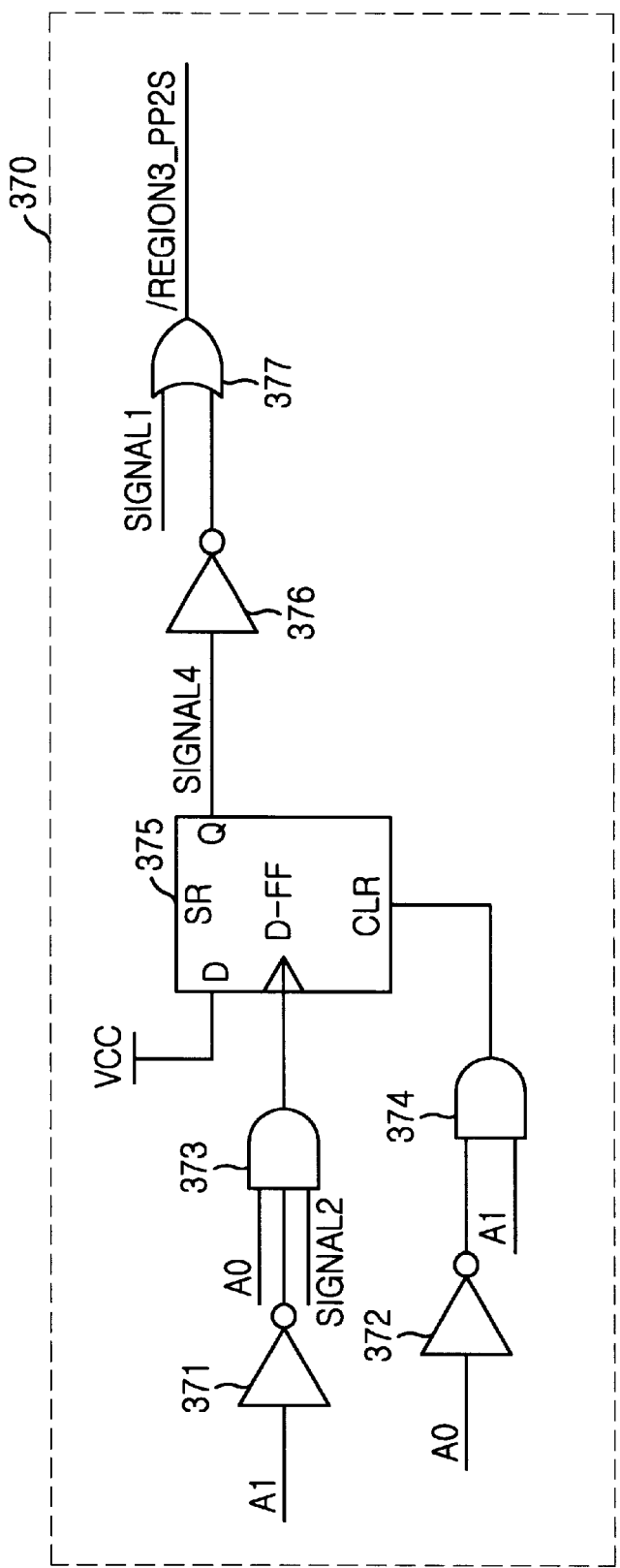
FIG. 6 is a detailed block diagram of a second region expansion clock generation block shown in FIG. 2 in accordance with a preferred embodiment of the present invention.

FIGS. 5 and 6 are a detailed block diagram of a first region expansion clock generation block shown in FIG. 2, and a detailed block diagram of a second region expansion clock generation block shown in FIG. 2, respectively, in accordance with the preferred embodiment of the present invention.

Figure 7:
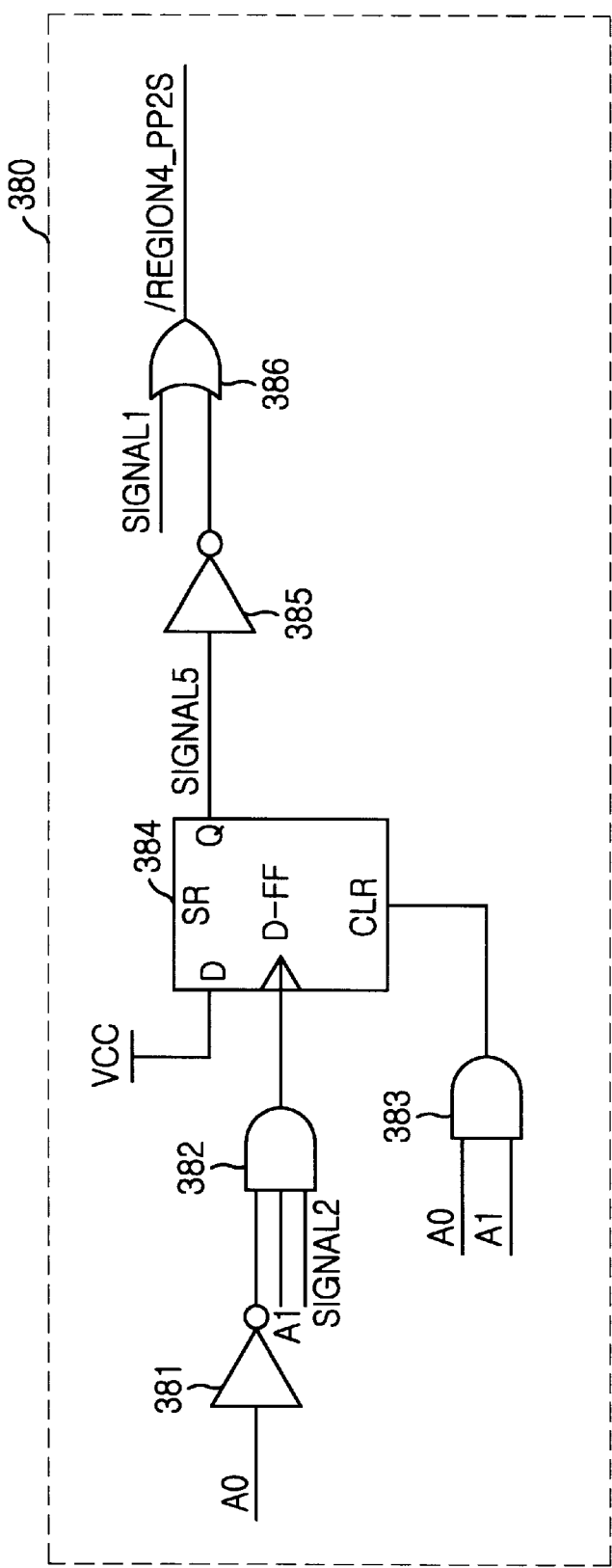
FIG. 7 is a detailed block diagram of a third region expansion clock generation block shown in FIG. 2 in accordance with a preferred embodiment of the present invention.
Figure 8:
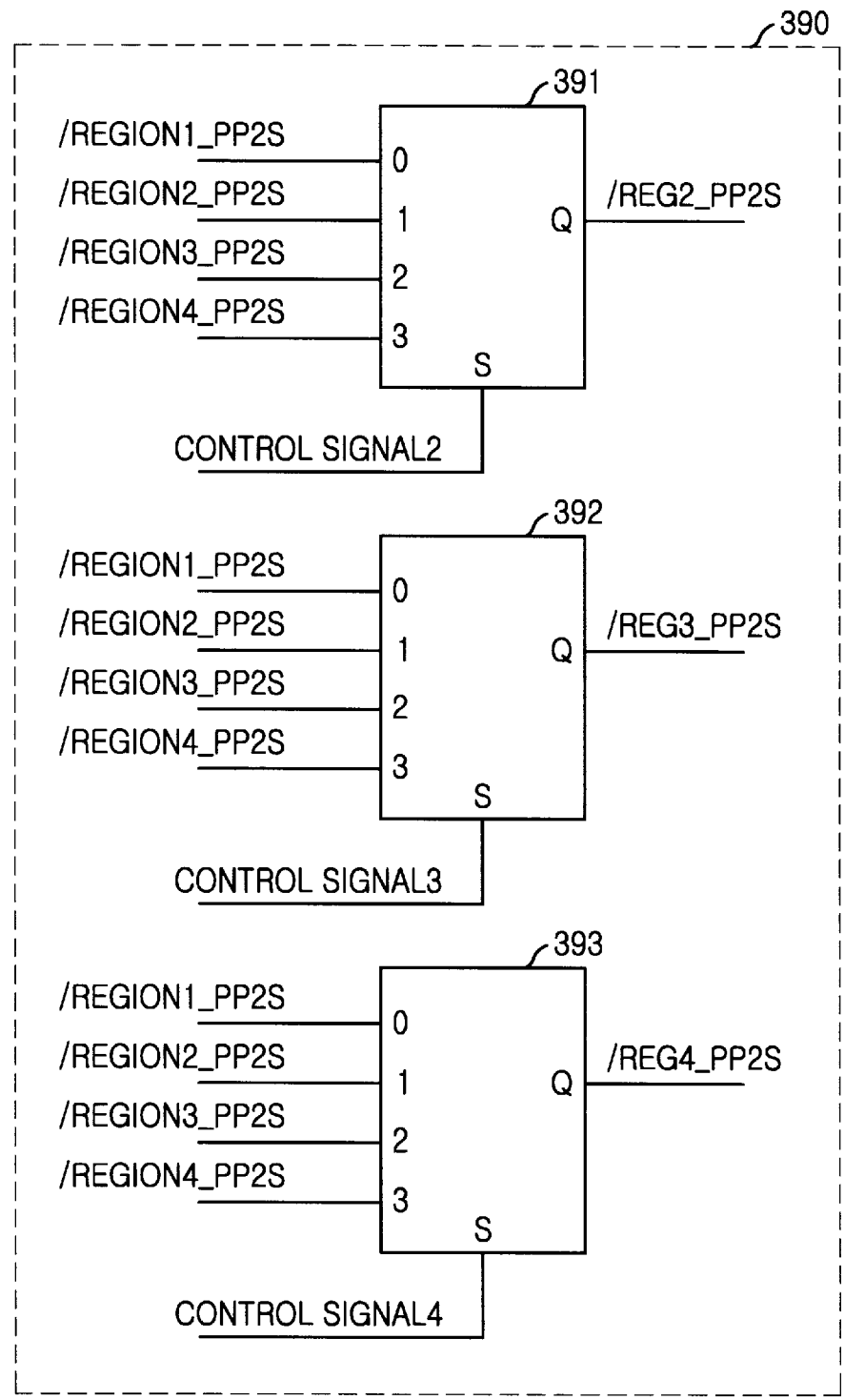
FIG. 8 is a detailed block diagram of a multiplexing block shown in FIG. 2 in accordance with a preferred embodiment of the present invention.
Figure 9:
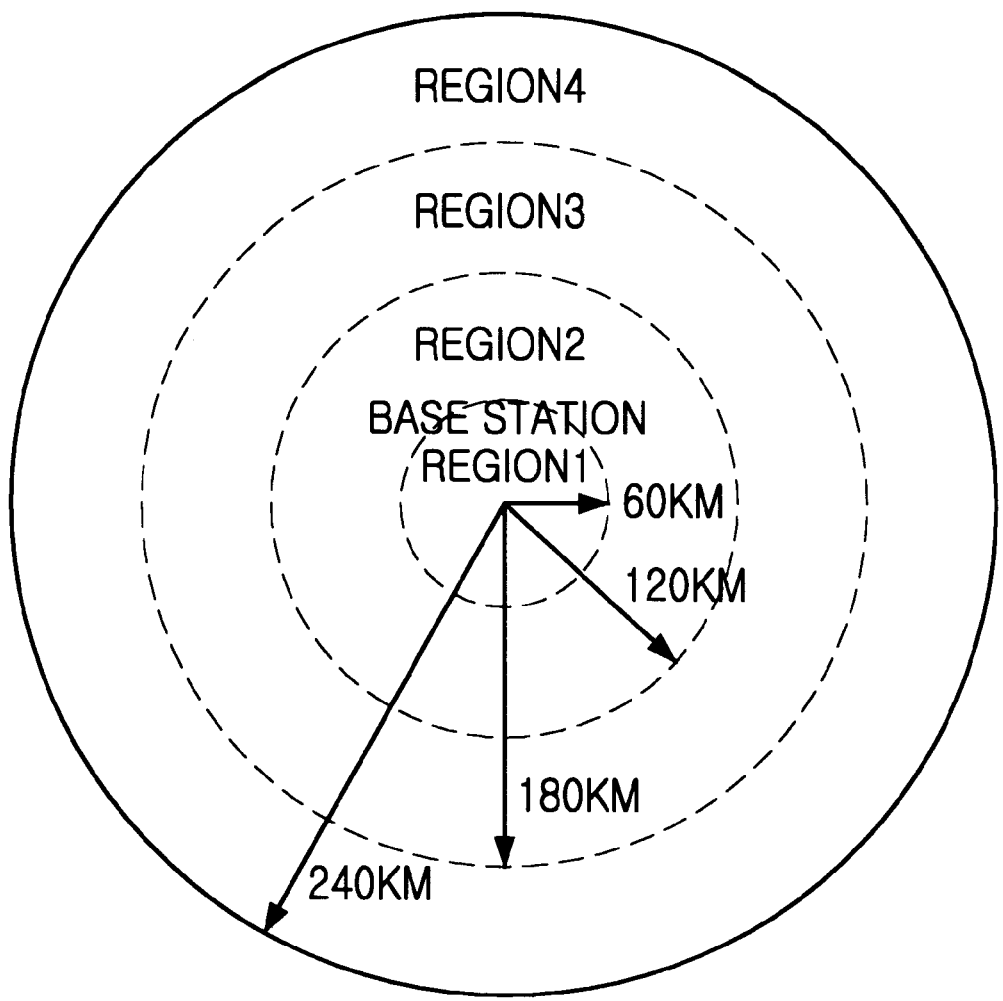
FIG. 9 is a pictorial view representing a coverage area of a base station in accordance with a preferred embodiment of the present invention.
Figure 10:
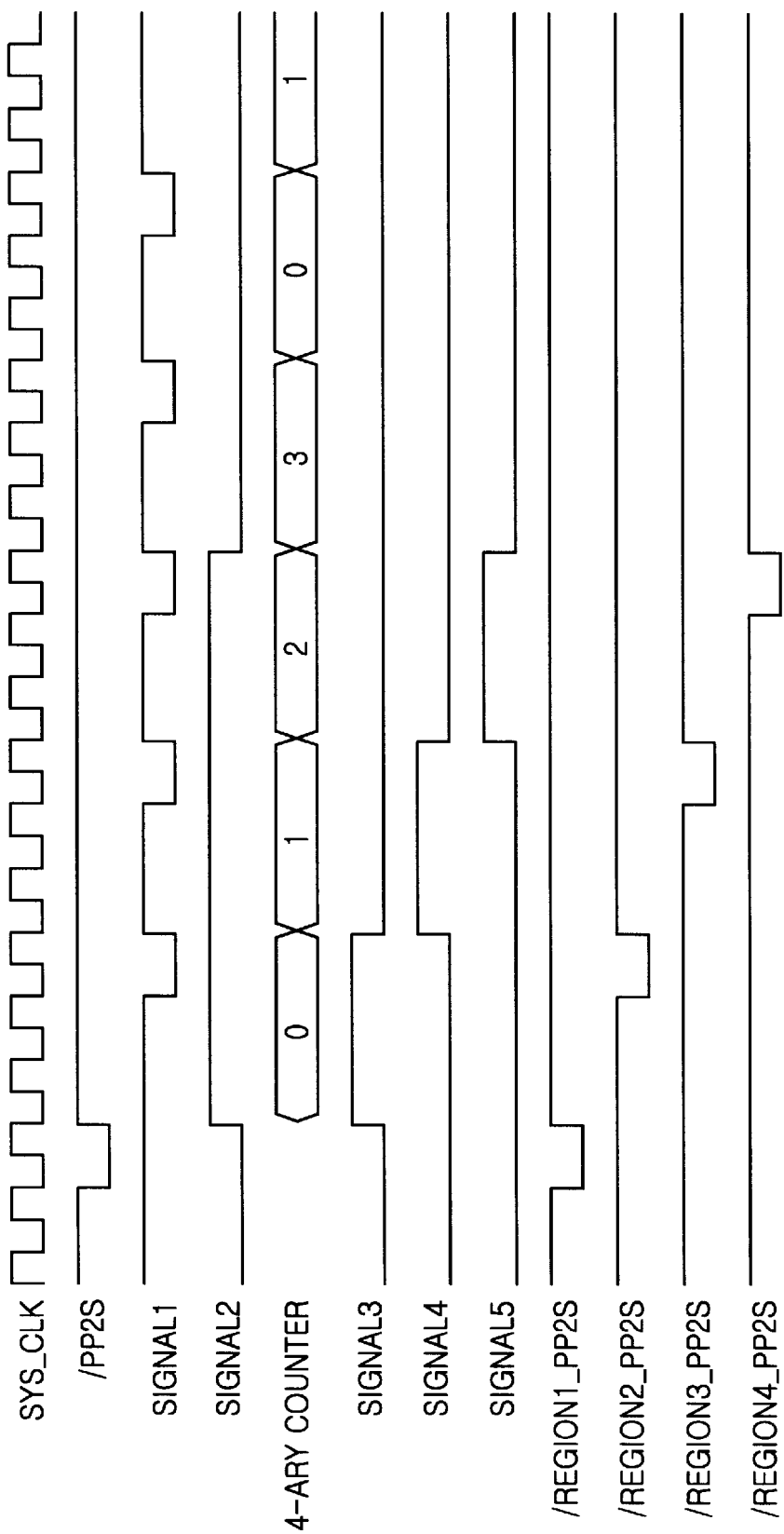
FIG. 10 is a timing chart representing each signal outputted from the clock generation block of the present invention.

FIGS. 7 to 9 are a detailed block diagram of a third region expansion clock generation block shown in FIG. 2, a detailed block diagram of a multiplexing block shown in FIG. 2, and a pictorial view representing a coverage area of a base station, respectively, in accordance with the preferred embodiment of the present invention.

As shown in FIGS. 2 to 8, the apparatus of the present invention comprises a GPS clock reception block 100, a system clock distribution block 200, a clock generation block 300, a base station modem block 400, a CPU 500 and a controller 600. The clock generation block 300 includes a latch 310, a counter 320, a comparator 330, a 4-ary counter 340, a signal generation block 350, first, second and third region expansion clock generation blocks 360, 370 and 380, and a multiplexing block 390.

The signal generation block 350 includes a NAND gate 351 and a D-flip flop 352. The first region expansion clock generation block 360 includes a first inverter 361, an AND gate 362, a D-flip flop 363, a second inverter 364, and an OR gate 365. The second region expansion clock generation block 370 includes a first inverter 371, a second inverter 372, a first AND gate 373, a second AND gate 374, a D-flip flop 375, a third inverter 376 and an OR gate 377.

The third region expansion clock generation block 380 includes a first inverter 381, a first AND gate 382, a second AND gate 383, a D-flip flop 384, a second inverter 385 and an OR gate 386. The multiplexing block 390 includes first, second and third multiplexers 391, 392 and 393.

The GPS clock reception block 100 serves to generate a system clock and a pp2s signal based on a reference time provided from a GPS (not shown), and the system clock distribution block 200 serves to distribute the system clock received from the GPS clock reception block 100.

The clock generation block 300 serves to receive the pp2s signal from the GPS clock reception block 100 and generate a clock signal to be used as a base station synchronous signals for the expansion of a coverage area. The base station modem block 400 incorporates therein a multiplicity of base station modems and serves to perform data modulation and demodulation in synchronism with the clock signals transmitted from the clock generation block 300.

The CPU 500 serves to output a control signal for controlling having the multiplicity of the base station modems 401 to 404 to the controller 600. The controller 600 controls to allow data to be transmitted to a wanted modem among the base station modems 401 to 404, in response to the control signal from the CPU 500.

The latch 310 in the clock generation block 300 serves to set a clock delay time based on the control signal from the controller 600. The counter 320 counts the system clock transmitted thereto from the GPS clock reception block 100 and is cleared if the pp2s signal is received.

The comparator 330 generates a signal 1 if the value set by the latch 310 is equal to the value counted by the counter 320. The 4-ary counter 340 counts clocks of the signal 1 transmitted thereto from the comparator 330 and is cleared if the pp2s signal is received from the GPS clock reception block 100.

The signal generation block 350 generates a signal 2 based on output signals a0 and a1 from the 4-ary counter 340 and the pp2s signal from the GPS clock reception block 100. The first region expansion clock generation block 360 generates a first coverage expansion signal based on the output signals a0 and a1 and the pp2s signal.

In the other hand, the second region expansion clock generation block 370 generates a second coverage expansion signal based on the output signals a0 and a1 from the 4-ary counter 340 and the signal 2 from the signal generation block 350. The third region expansion clock generation block 380 generates a third coverage expansion signal based on the output signals a0 and a1 from the 4-ary counter 340 and the signal 2 from the signal generation block 350.

The multiplexing block 390 receives the pp2s signal from the GPS clock reception block 100 and the first, the second and the third coverage expansion signals from the first, the second and the third region expansion clock generation blocks 360, 370 and 380, and outputs a signal defined by the control signal from the controller 600.

The NAND gate 351 in the signal generation block 350 receives the output signals a0 and a1 of four-bits from the 4-ary counter 340 and outputs a logic low signal if the counted value is 3. The D-flip flop 352 generates the signal 2 if the pp2s signal is fed thereto from the GPS clock reception block 100, and holds in an inactive state if the logic low signal is fed thereto from the NAND gate 351.

The first inverter 361 in the region expansion clock generation block 360 inverts the output signal a1 provided thereto from the 4-ary counter 340. The AND gate 362 logically combines the inverted signal from the first inverter 361 and the output signal a1 from the 4-ary counter 340, and outputs the same.

On the one side, the D-flip flop 363 receives the output signal from the AND gate 362 as a clear signal, and generates the signal 3 based on the pp2s signal (i.e., the clock signal) received from the GPS clock reception block 100. The second inverter 364 inverts the output signal (i.e., the signal 3) from the D-flip flop 363.

The OR gate 365 performs an OR operation on the signal 1 from the comparator 330 and the inverted signal for the signal 3 from the second inverter 364 to thereby generate the resultant data as a first coverage expansion signal.

The first inverter 371 in the second region expansion clock generation block 360 performs an inversion operation on the output signal a1 from the 4-ary counter 340, and the second inverter 372 performs an inversion operation on the output signal a0 from the 4-ary counter 340.

The first AND gate 373 logically combines the inverted signal for the signal a1 from the first inverter 371, the output signal a0 from the 4-ary counter 340 and the signal 2 from the signal generation block 350, and outputs a combined value. The second AND gate 374 logically combines the inverted signal for the signal a0 from the second inverter 372 and the output signal a1 from the 4-ary counter 340, and outputs a combined value.

Meanwhile, the D-flip flop 375 receives the output signal from the first AND gate 373 as a clock signal and the output signal from the second AND gate 374 as a clear signal, and generates the signal 4 based on these received signals. The third inverter 376 inverts the signal 4 provided thereto from the D-flip flop 375.

The OR gate 377 performs an OR operation on the inverted signal for the signal 4 from the third inverter 376 and the signal 1 from the comparator 330 to output the resultant data as a second coverage expansion signal.

On the one side, the first inverter 381 in the third region expansion clock generation block 380 performs an inversion operation on the output signal a0 from the 4-ary counter 340. The first AND gate 382 logically combines the inverted signal for the signal a0 from the first inverter 381, the output signal a0 from the 4-ary counter 340 and the signal 2 from the signal generation block 350, and outputs a combined value.

The second AND gate 383 performs an AND operation on the output signals a0 and a1 from the 4-ary counter 340 and outputs a combined value. The D-flip flop 384 receives the output signal from the first AND gate 372 as a clock signal and the output signal from the second AND gate 383 as a clear signal, and generates a signal 5 based on these received signals.

The second inverter 385 performs an inversion operation on the signal 5 provided thereto from the D-flip flop 384. The OR gate 386 performs an OR operation on the signal 1 from the signal generation block 350 and the inverted signal for the signal 5 from the third inverter 376 to output the resultant data as a third coverage expansion signal.

In the mean time, the multiplexer 391 in the multiplexing block 390 receives the pp2s signal from the GPS clock reception block 100 and the first, the second and the third coverage expansion signals from the first, the second and the third region expansion clock generation blocks 360, 370 and 380, and selectively outputs one of the pp2s signal and the first coverage expansion signal according to the control signal from the controller 600.

The multiplexer 392 receives the pp2s signal from the GPS clock reception block 100 and the first, the second and the third coverage expansion signals from the first, the second and the third region expansion clock generation blocks 360, 370 and 380, and selectively outputs one of the pp2s signal and the first and second coverage expansion signals according to the control signal from the controller 600.

The multiplexer 393 receives the pp2s signal from the GPS clock reception block 100 and the first, the second and the third coverage expansion signals from the first, the second and the third region expansion clock generation blocks 360, 370 and 380, and selectively outputs one of the pp2s signal and the first, the second and the third coverage expansion signals according to the control signal from the controller 600.

A detailed explanation of operation of the inventive apparatus will now be provided.

If the GPS clock reception block 100 generates the system clocks(19.6608 MHz) and the pp2s signal required for the base station modem block 400 based on the reference signal received from a GPS (not shown), the system clock distribution block 200 distributes the system clocks in correspondence to the number of the base station modems.

The clock generation block 300 receives the pp2s signal from the GPS clock reception block 100 and provides the received signal to the base station modem block 400 to allow it to call a terminal within an wanted region. In this case the CPU 500 transmits a control signal for the provision of the data to the base station modem block 400.

After that, in response to the control signal from the CPU 500, the controller 600 generates the control signal to the clock generation block 300 and the base station modem block 400 to allow data to be transmitted to a base station modem defined by the CPU 500. The base station modem block 400 modulates and demodulates the pp2s signal and the data provided thereto from the clock generation block 300 and the CPU 500 for calling.

The following detailed discussions are directed to the calling process in the clock generation block 300. First, provided that a board incorporating a clock generation unit therein is utilized in a place at which the coverage area of a base station is distributed into four regions. In the occasion, registers of the clock generation block are set as follows.

The latch 310 in the clock generation block 300 sets a clock delay time based on the control signal from the controller 600. The multiplexer 391 in the multiplexing block 390 selects the second coverage expansion signal /REGION2_PP2S in response to the control signal 2, The multiplexer 392 selects the third coverage expansion signal /REGION3_PP2S in response to the control signal 3, and the multiplexer 393 selects the fourth coverage expansion signal /REGION4_PP2S in response to the control signal 4.

The following detailed discussions are directed to a process for expanding a coverage area of the terminal. As shown in FIG. 9, when the terminal is dialing within a region 1, the base station modem 401 covering the region 1 communicates with the terminal.

In this case, when the terminal moves from the region 1 to a region 2, the base station modem 401 fails to demodulate data incoming thereto from the terminal of the region 2, because the data transmitted from the region 2 has been delayed by 512PN chip+region 2. Specifically, the base station modem 401 placed within the region 1 has the ability of demodulate only a delay less than the reference signal by 512PN chip.

In case the base station modem 401 fails to the demodulation for the region 2, the CPU 500 senses that the terminal is locating in the region 2 and outputs a control data for establishing the calling between the terminal and the base station modem 402 to the controller 600. In response to the control signal, the controller 600 provides a control signal corresponding to the control data from the CPU 500 to the modem 402.

After that, the latch 310 in the clock generation block 300 sets a clock delay time based on the control signal from the controller 600. The counter 320 counts the system clocks provided thereto from the GPS clock reception block 100 and resets a counted value for the system clocks if the pp2s signal is received.

In the comparator 330, the signal 1 is generated if the set value by the latch 310 and the counted value from the counter 320 are equal. The 4-ary counter 340 counts clocks of the signal 1 transmitted thereto from the comparator 330 and resets the counted value if the pp2s signal is received.

On the one side, the NAND gate 351 in the signal generation block 350 receives the output signals a0 and a1 of four-bits from the 4-ary counter 340 and outputs a logic low signal if the counted value is 3. The D-flip flop 352 outputs the signal 2 if the pp2s signal is received from the GPS clock reception block 100, and holds in an inactive state if the logic low signal is received from the NAND gate 351.

The first inverter 361 in the region expansion clock generation block 360 inverts the output signal a1 provided thereto from the 4-ary counter 340. The AND gate 362 logically combines the inverted signal from the first inverter 361 and the output signal a0 from the 4-ary counter 340, and outputs a logically combined value.

The D-flip flop 363 receives the output signal from the AND gate 362 and the pp2s signal from the GPS clock reception block 100 as a clear signal and a clock signal, respectively, and generates the signal 3 based on these received signals. Then, the second inverter 364 inverts the output signal provided thereto from the D-flip flop 363.

The OR gate 365 performs an OR operation on the signal 1 from the comparator 330 and the inverted signal for the signal 3 from the second inverter 364 to thereby generate a first coverage expansion signal for the region 2. As a result, the terminal moved from the region 1 to the region 2 has the ability of call for the base station modem 402 covering the region 2.

Meanwhile, when the terminal moves from the region 2 to the region 3, the first inverter 371 in the second region expansion clock generation block 370 inverts the output signal a1 provided thereto from the 4-ary counter 340, and the second inverter 372 inverts the output signal a0 provided thereto from the 4-ary counter 340.

Then, the first AND gate 373 logically combines the inverted signal for the signal a1 from the first inverter 371, the output signal a0 from the 4-ary counter 340 and the signal 2 from the signal generation block 350, and outputs a combined value. The second AND gate 374 logically combines the inverted signal for the signal a0 from the second inverter 372 and the output signal a1 from the 4-ary counter 340, and outputs a logically combined value.

The D-flip flop 375 receives the output signal from the first AND gate 373 as a clock signal and the output signal from the second AND gate 374 as a clear signal, and generates the signal 4 based on these received signals. The third inverter 376 inverts the signal 4 provided thereto from the D-flip flop 375 and outputs an inverted signal to the OR gate 377.

The OR gate 377 performs an OR operation on the inverted signal from the third inverter 376 and the signal 1 from the comparator 330 to output the resultant data as a second coverage expansion signal for the region 3. As a result, the terminal moved from the region 2 to the region 3 has the ability of call for the base station modem 403 covering the region 3.

When the terminal moves from the region 3 to the region 4, the first inverter 381 in the third region expansion clock generation block 380 inverts the output signal a0 provided thereto from the 4-ary counter 340, and the first AND gate 382 logically combines the inverted signal for the signal a0 from the first inverter 381, the output signal a0 from the 4-ary counter 340 and the signal 2 from the signal generation block 350, and outputs a logically combined value.

Then, the second AND gate 383 logically combines the output signals a0 and a1 from the 4-ary counter 340 and outputs a combined value. The D-flip flop 384 receives the output signal from the first AND gate 382 as a clock signal and the output signal from the second AND gate 383 as a clear signal, and generates the signal 5 based on these received signals.

The second inverter 385 inverts the signal 5 provided thereto from the D-flip flop 384 and outputs an inverted signal to the OR gate 386. The OR gate 386 performs an OR operation on the signal 1 from the signal generation block 350 and the inverted signal for the signal 5 from the second inverter 385 to output the resultant data as a third coverage expansion signal for the region 4. As a result, the terminal moved from the region 3 to the region 4 has the ability of calling for the base station modem 404 covering the region 4.

In short, when the terminal fails to call up the base station modem 402 covering the region 2, the CPU 500 senses that the terminal is locating in the region 3 and outputs a control signal for establishing the calling up between the terminal and the base station modem 403 to the controller 600. In response to the control signal, the controller 600 provides a control signal corresponding to the control signal from the CPU 500 to the modem 403.

Accordingly, the terminal moved from the region 2 to the region 3 has the ability of calling for the base station modem 403 covering the region 3.

Further, when the terminal fails to call up the base station modem 403 covering the region 3, the CPU 500 senses that the terminal is locating in the region 4 and outputs a control signal for establishing the calling up between the terminal and the base station modem 404 to the controller 600. Similarly, the controller 600 provides a control signal corresponding to the control signal from the CPU 500 to the modem 404.

Accordingly, the terminal moved from the region 3 to the region 4 has the ability of call for the base station modem 404 covering the region 4.

As mentioned above, the pp2s signal from the GPS clock reception block 100, and the first to the third coverage expansion signals from each of the first to the third region expansion clock generation blocks 360 to 380 are conveyed to the first to the third multiplexers 391, 392 and 393 which output the pp2s signal and the first to the third coverage expansion signals, respectively, in response to the control signal from the controller 600.

That is, as shown in FIG. 8, /REGION1_PP2S, /REGION2_PP2S, /REGION3_PP2S and /REGION4_PP2S represent the pp2s signal and the first to the third coverage expansion signals outputted from the multiplexers 391, 392 and 393 in the multiplexing block 390, respectively, in response to the control signals 2 to 4 from the controller 600.

As demonstrated above, the present invention can control a GPS reference signal pp2s to be transmitted to a base station modem to thereby expand a coverage area of the base station to four times at maximum. As a result, the present invention offers an expanded coverage area without installing an additional base station in areas including the sea in which it is difficult to install a base station, a location with few subscribers or the like. Accordingly, there is an advantageous effect that installation cost can be dropped.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for generating a clock signal used to expand a coverage area of a base station, the apparatus comprising:

a clock reception means for generating a system clock and a pp2s(pulse per 2 seconds) signal based on a reference time provided from a global positioning system (GPS);

a clock distribution means for distributing the system clock received from the clock reception means;

a clock generation means for generating clock signals as base station synchronous signals to expand the coverage area by receiving the pp2s signal from the clock reception means;

a multiplicity of base station modems for modulating/demodulating data in synchronism with the clock signal transmitted from the clock generation means;

a control signal generation means for generating control signals; and a control means for allowing the data to be transmitted to a selected base station modem among the base station modems in response to a corresponding control signal from the control signal generation means.

2. The apparatus as recited in claim 1, wherein the clock generation means includes:

a latch means for setting a clock delay time based on the control signal from the control means;

a count means for counting the system clock transmitted thereto from the clock reception means and being cleared if the pp2s signal is received;

a comparison means for generating a first signal if a value set at the latch means is equal to a value counted by the count means;

a 4-nary counter for counting clocks of the first signal transmitted thereto from the comparison means and being cleared when the pp2s signal is received from the clock reception means;

a signal generation means for generating a second signal based on an a0 signal and an a1 signal outputted from the 4-nary counter and the pp2s signal from the clock reception means;

a first clock generation means for generating a first coverage expansion signal, based on the a0 signal and the a1 signal and the pp2s signal;

a second clock generation means for generating a second coverage expansion signal based on the a0 signal and the a1 signal from the 4-nary counter and the second signal from the signal generation means;

a third clock generation block for generating a third coverage expansion signal based on the a0 signal and the a1 signal from the 4-nary counter and the second signal from the signal generation means; and a multiplexing means for receiving the pp2s signal from the clock reception means and the first, second and third coverage expansion signals from the first, second and third clock generation means and outputting a signal defined by the control signal from the control means.

3. The apparatus as recited in claim 2, wherein the signal generation means includes:

a NAND gate for receiving the a0 signal and the a1 signal of four-bits from the 4-nary counter and outputting a logic low signal if a counted value is 3;

a D-flip flop for generating the second signal if the pp2s signal is fed thereto from the clock reception means and holding in an inactive state if the logic low signal is fed thereto from the NAND gate.

4. The apparatus as recited in claim 2, wherein the first clock generation means includes:

a first inverter for inverting the a1 signal provided thereto from the 4-nary counter;

a first AND gate for logically combining the inverted a1 signal from the first inverter and the a0 signal from the 4-nary counter and outputting a first combined signal;

a first D-flip flop for receiving the first combined signal outputted from the first AND gate as a clear signal and generating a third signal based on the pp2s signal received from the clock reception means;

a second inverter for inverting the third signal from the first D-flip flop; and an first OR gate for performing an OR operation on the first signal from the comparison means and the inverted third signal from the second inverter to thereby generate the resultant data as a first coverage expansion signal.

5. The apparatus as recited in claim 2, wherein the second clock generation means includes:

a third inverter for performing an inversion operation on the a1 signal from the 4-nary counter;

a fourth inverter for performing an inversion operation on the a0 signal from the 4-nary counter;

a second AND gate for logically combining the inverted a1 signal from the third inverter, the a0 signal from the 4-nary counter and the second signal from the signal generation means and outputting a second combined signal;

a third AND gate for logically combining the inverted a0 signal from the fourth inverter and the a1 signal from the 4-nary counter and outputting a third combined signal;

a second D-flip flop for receiving the second combined signal from the second AND gate as a clock signal and the third combined signal from the third AND gate as a clear signal, and generating a fourth signal based on these received signals;

a fifth inverter for inverting the fourth signal provided thereto from the second D-flip flop; and a second OR gate for performing an OR operation on the inverted fourth signal from the fifth inverter and the first signal from the comparison means to output the resultant data as a second coverage expansion signal.

6. The apparatus as recited in claim 2, wherein the third clock generation means includes:

a sixth inverter for performing an inversion operation on the a0 signal from the 4-nary counter;

a fourth AND gate for logically combining the inverted a0 signal from the sixth inverter, the a0 signal from the 4-nary counter and the second signal from the signal generation means and outputting a fourth combined signal;

a fifth AND gate for performing an AND operation on the a0 signal and the a1 signal from the 4-nary counter and outputs a fifth combined signal;

a third D-flip flop for receiving the fourth combined signal from the fourth AND gate as a clock signal and the fifth combined signal from the fifth AND gate as a clear signal, and generating the fifth signal based on these received signals;

a seventh inverter for performing an inversion operation on the fifth signal provided thereto from the third D-flip flop; and a third OR gate for performing an OR operation on the first signal from the signal generation means and the inverted fifth signal from the seventh inverter to output the resultant data as a third coverage expansion signal.

7. The apparatus as recited in claim 2, wherein the multiplexing means includes:

a first multiplexer for receiving the pp2s signal from the clock reception means and the first, second and third coverage expansion signals from the first, second and third clock generation means and selectively outputting one of the pp2s signal and the first coverage expansion signal according to the control signal from the control means;

a second multiplexer for receiving the pp2s signal from the clock reception means and the first, second and third coverage expansion signals from the first, second and third clock generation means, and selectively outputting one of the pp2s signal and the first and second coverage expansion signals according to the control signal from the control means; and a third multiplexer for receiving the pp2s signal from the clock reception means and the first, second and third coverage expansion signals from the first, second and third clock generation means, and selectively outputting one of the pp2s signal and the first, second and third coverage expansion signals according to the control signal from the control means.

* * * * *